United States Patent
Furumoto (10) Patent No.: US 10,816,668 B2
(45) Date of Patent: Oct. 27, 2020

(54) DOPPLER SHIFT ANALYSIS DEVICE

(71) Applicant: METROWEATHER CO., LTD., Uji-shi, Kyoto (JP)

(72) Inventor: Junichi Furumoto, Uji (JP)

(73) Assignee: METROWEATHER CO., LTD., Uji-Shi, Kyoto (JP)

(*) Notice: Subject to any disclaimer, the term of this patent is extended or adjusted under 35 U.S.C. 154(b) by 0 days.

(21) Appl. No.: 16/306,359

(22) PCT Filed: May 31, 2016

(86) PCT No.: PCT/JP2016/066085
§ 371 (c)(1),
(2) Date: Nov. 30, 2018

(87) PCT Pub. No.: WO2017/208375
PCT Pub. Date: Jul. 12, 2017

(65) Prior Publication Data
US 2019/0346571 A1    Nov. 14, 2019

(51) Int. Cl.
*G01C 3/08* (2006.01)
*G01S 17/95* (2006.01)
*G01P 5/26* (2006.01)
*G01S 7/48* (2006.01)
*G01S 17/58* (2006.01)

(52) U.S. Cl.
CPC .............. *G01S 17/95* (2013.01); *G01P 5/26* (2013.01); *G01S 7/4808* (2013.01); *G01S 17/58* (2013.01)

(58) Field of Classification Search
CPC ........ G01S 17/95; G01S 17/58; G01S 7/4808; G01P 5/26

USPC ......................................................... 356/5.09
See application file for complete search history.

(56) References Cited

U.S. PATENT DOCUMENTS

| | | | | |
|---|---|---|---|---|
| 5,563,604 A | * | 10/1996 | Brandao | G01S 13/951 342/159 |
| 5,568,151 A | * | 10/1996 | Merritt | G01S 13/58 342/192 |
| 6,307,500 B1 | * | 10/2001 | Comman | G01S 13/58 342/26 R |

FOREIGN PATENT DOCUMENTS

| JP | 2004-085472 | 3/2004 |
|---|---|---|
| JP | 2005-030809 | 2/2005 |

(Continued)

OTHER PUBLICATIONS

Extended Search Report dated Dec. 16, 2019 issued in European Patent Application No. 16904000.3.

(Continued)

*Primary Examiner* — Mark Hellner
(74) *Attorney, Agent, or Firm* — Cozen O'Connor (57) ABSTRACT

Analysis device 3 is provided with a data acquisition unit 22 for acquiring reflected light data for a laser light reflected by an atmospheric aerosol, and a control unit 21 for analyzing a Doppler shift of the reflected light data. The control unit 21 is provided with a result smoothing unit 43 for excluding a peak portion 51 in the reflected light originating from an obstacle. Further, a peak portion 51 originating from an obstacle is determined to be a peak portion originating from an obstacle when there is a steep slope of a predetermined amount or more in reception intensity within a frequency of a predetermined extent from a transmission frequency of the laser light. The Doppler shift is thus analyzed with a high degree of accuracy.

18 Claims, 5 Drawing Sheets

(56) References Cited

FOREIGN PATENT DOCUMENTS

| JP | 2008-014837 | 1/2008 |
|----|-------------|--------|
| JP | 2012-103050 | 5/2012 |

OTHER PUBLICATIONS

Rahm et al., "Airborne cw-Doppler Lidar ADOLAR," Apr. 6, 1995, pp. 205-207.

* cited by examiner

DOPPLER SHIFT ANALYSIS DEVICE

RELATED APPLICATIONS

This is a U.S. National Phase Application under 35 USC 371 of International Application PCT/JP2016/066085 filed on May 31, 2016.

FIELD OF THE INVENTION

The present invention relates to a Doppler shift analysis device, a Doppler shift analysis method, and a Doppler shift analysis program for analyzing a Doppler shift to observe a wind condition, for example.

BACKGROUND OF THE INVENTION

Conventionally, a Coherent Doppler Lidar (CDL) has been suggested, in which wind velocities and/or aerosol amount is/are obtained by irradiating laser light into atmosphere to obtain scattering from atmospheric dust (aerosol) with a telescope (refer to Patent Literature 1).

In such CDL, a peak-searching method is used for determining the wind velocities, in which a frequency with a highest spectrum power density is assumed as the Doppler shift, after performing Fourier transformation. In addition, a moment method is also used, in which a moment operation is performed around a peak to obtain the Doppler shift from the first moment.

Here, the aerosol which is a scattering body used by the CDL, is in eddy motion by a turbulent flow. Resulting from such effect, a spectrum of data observed by the telescope has a normal distribution shape with a peak at a radial wind velocity value. In addition, a normal distribution which center is 0 m/s (transmission frequency) due to a collision with an atmospheric molecule is superimposed on the spectrum. Because of this, there is a problem that such approach has an unavoidable disadvantage that an absolute value of the wind velocity is estimated smaller.

In addition, there is a problem that, in the above described method of peak-searching only, or the method determining moment therearound after peak-searching, reliability of estimated values considerably deteriorates at far distance where the SN ratio is low. Thus, the CDL so far has been limited for short distance of observation extent which is about 10 km.

Further, laser output of the CDL is actually limited to Level 1M so that human body safety is secured. Thus, raising the laser output and making the distance of the observation extent longer is not permitted.

Under such circumstances, a detection in longer distance or with a high degree of accuracy has been desired.

CITATION LIST

Patent Literature 1: Japanese Laid-Open Patent Publication JP2008-124389

SUMMARY OF INVENTION

One object of the present invention is to provide a device which allows analyzing the Doppler shift with a high degree of accuracy considering the above described problems.

One aspect of the present invention is directed to a Doppler shift analysis device and Doppler shift analysis, comprising a data acquisition unit for acquiring reflected light data for a laser light reflected by an atmospheric aerosol; and an operation unit for analyzing a Doppler shift of the reflected light data, wherein the operation unit comprises a peak-originating-from-obstacle exclusion unit for excluding a peak portion in the reflected light originating from an obstacle.

With the present invention, the Doppler shift can be analyzed with a high degree of accuracy.

DETAILED DESCRIPTION OF THE DRAWINGS

One embodiment of the present invention is described in connection with the drawings in the following discussion.

Example 1

Figure 1:
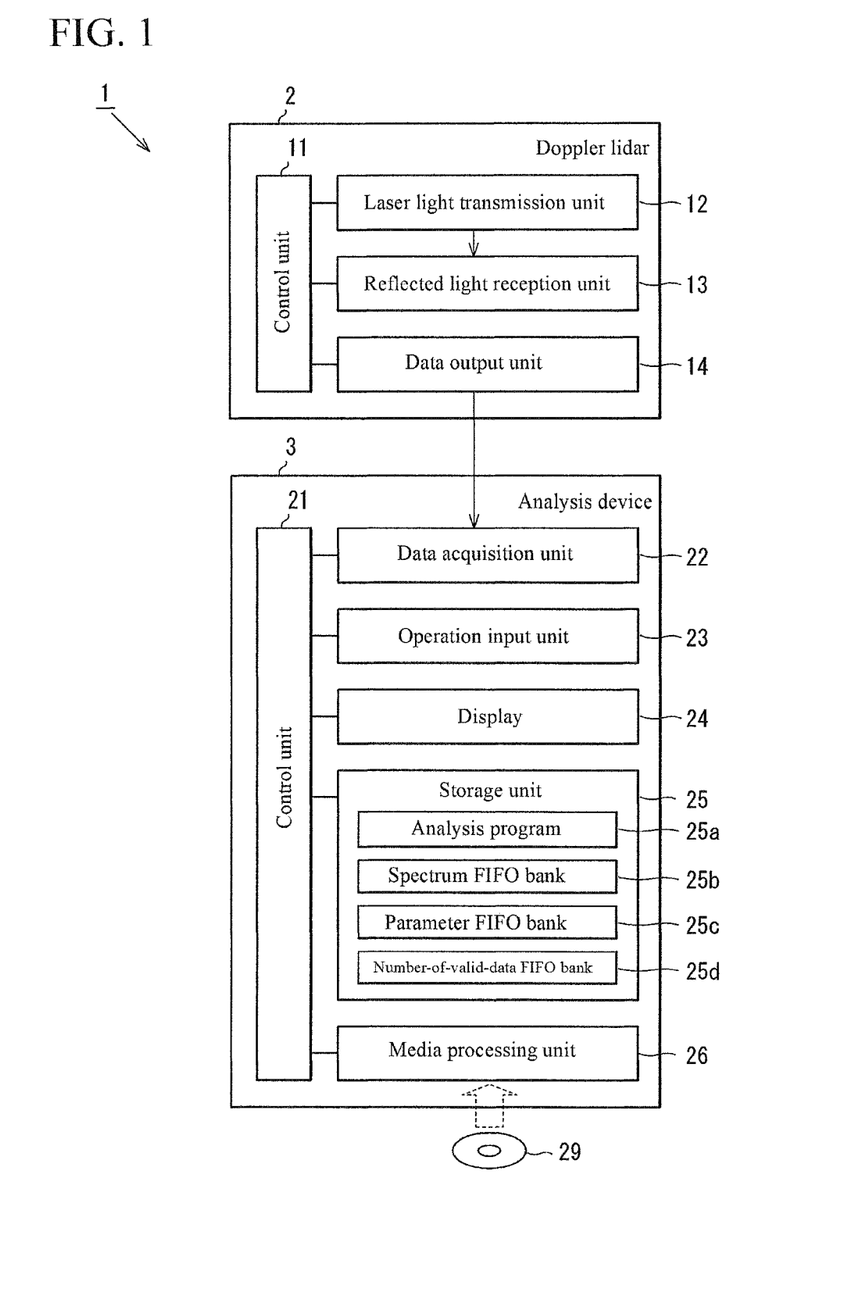
FIG. 1 is a block diagram illustrating a configuration of a wind condition analysis system.

FIG. 1 a block diagram illustrating a configuration of a wind condition analysis system 1.

The wind condition analysis system 1 is configured by a Doppler lidar 2 and an analysis device 3.

The Doppler lidar 2 is provided with a control unit 11 for executing various controls, a laser light transmission unit 12 for transmitting laser light, a reflected light reception unit 13 for receiving reflected light for the laser light reflected by the aerosol, and a data output unit 14 for outputting data.

The laser light transmission unit 12 transmits a pulse laser, which oscillating wavelength has been made narrower-banded by injection locking with a master laser, to atmosphere. This transmission is made toward whole circumference of 360° in a horizontal direction, and also toward upward changing angles of transmission in a vertical direction. That is, the pulse laser is transmitted such that an upper hemisphere area, which center is the laser light transmission unit 12, is covered.

The reflected light reception unit 13 receives reflected light scattered by the aerosol and subjected to the Doppler shift, and synthesizes the reflected light and the master laser from the laser light transmission unit 12 on a mixer. The reflected light reception unit 13 amplifies a low-frequency beat signal among the synthesized signal components by an I.F. Amp, and the amplified signal is analog-to-digital converted by an analog-to-digital converter to make a digital signal.

The data output unit 14 sends reflected light data made as the digital signal by the reflected light reception unit 13 to the analysis device 3.

The analysis device 3 is provided with a control unit 21 (operation unit) for executing various operations and controls, a data acquisition unit 22 for acquiring data such as the reflected light data, an operation input unit 23 such as a keyboard and a mouse, a display unit 24 such as a liquid crystal display or CRT etc., a storage unit 25 configured by a hard disk or a non-volatile memory etc., and a media processing unit 26 for executing read and write of data for a storage medium 29 such as CD-ROM.

The storage unit 25 stores various programs such as an analysis program 25a (a Doppler shift analysis program), and various data such as a spectrum FIFO bank 25b, a parameter FIFO bank 25c, and a number of valid data FIFO bank 25d. The analysis program 25a here is what has been stored in a storage medium 29, and is read by the media processing unit 26 and installed to the storage unit 25.

Figure 2:
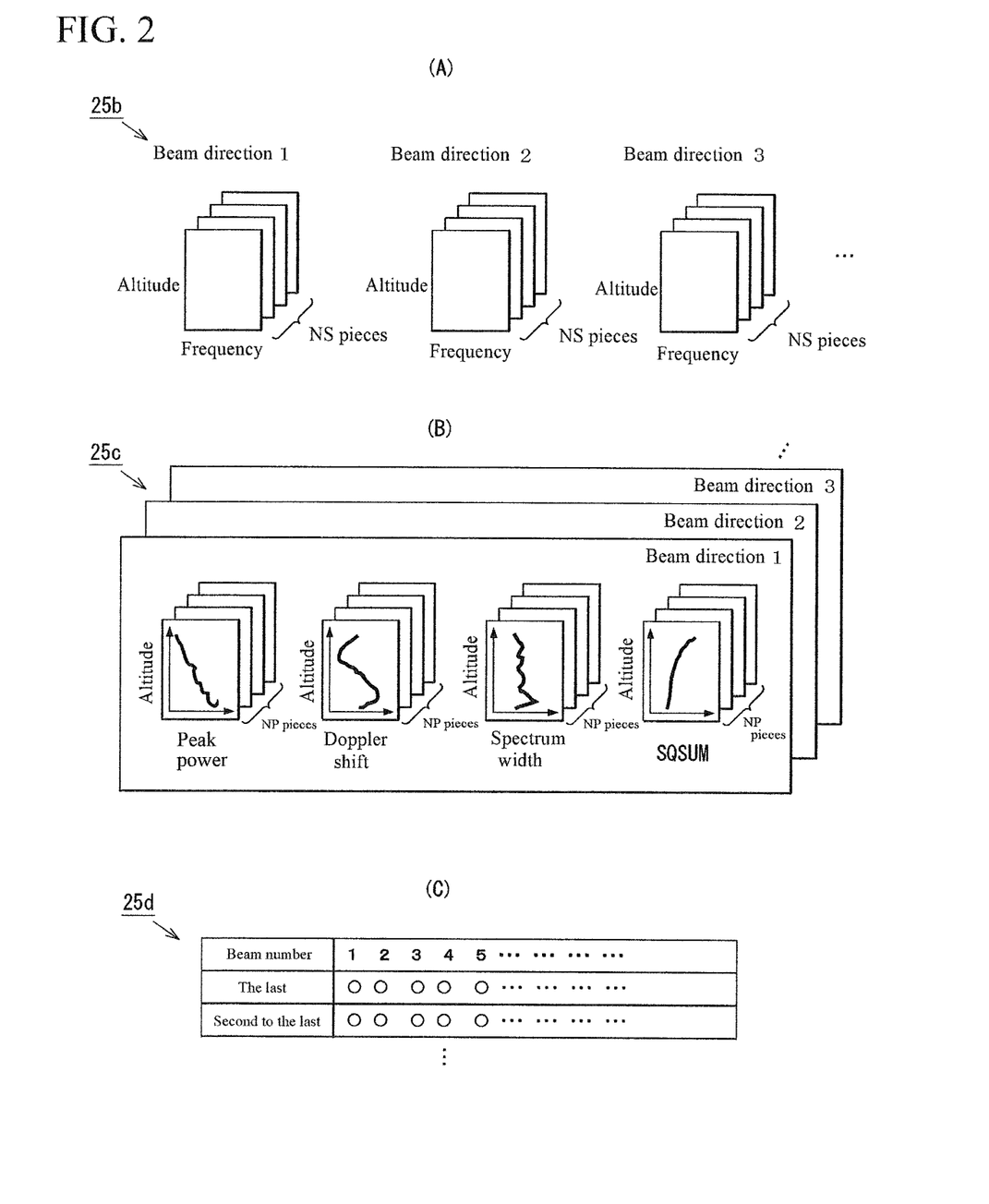
FIG. 2 shows explanatory diagrams each illustrating a configuration of data.

FIG. 2 shows explanatory diagrams each illustrating a configuration of data, in which FIG. 2 (A) shows a configuration diagram of the spectrum FIFO bank 25b, FIG. 2 (B) shows a configuration diagram of the parameter FIFO bank 25c, and FIG. 2 (C) shows a configuration diagram of the number of valid data FIFO bank 25d.

As shown in FIG. 2 (A), the spectrum FIFO bank 25b stores NS pieces of information on altitude and frequency separately for each beam direction. The spectrum FIFO bank 25b adds newly acquired data, and when the data exceed NS pieces, deletes the data in chronological order. Thus, consistently new NS pieces of spectrum data are stored in the spectrum FIFO bank 25b.

As shown in FIG. 2 (B), the parameter FIFO bank 25c stores NP pieces of data respectively for altitude and peak power, altitude and Doppler shift, altitude and spectrum width, and altitude and SQSUM separately for each beam direction. The parameter FIFO bank 25c also adds newly acquired data, and when the data exceed NP pieces, deletes the data in chronological order. Thus, consistently new NP pieces of parameter data are stored in the parameter FIFO bank 25c.

As shown in FIG. 2 (C), the number-of-valid-data FIFO bank 25d stores validity or invalidity of data acquired in the past separately for each beam number. The number-of-valid-data FIFO bank 25d stores validity or invalidity of data from the latest one in order, such as the last data, second to the last data, and adds data as needed when there is new data. Therefore, validity of a plurality of data are stored consistently from new ones separately for each beam number in the number-of-valid-data FIFO bank 25d.

Figure 3:
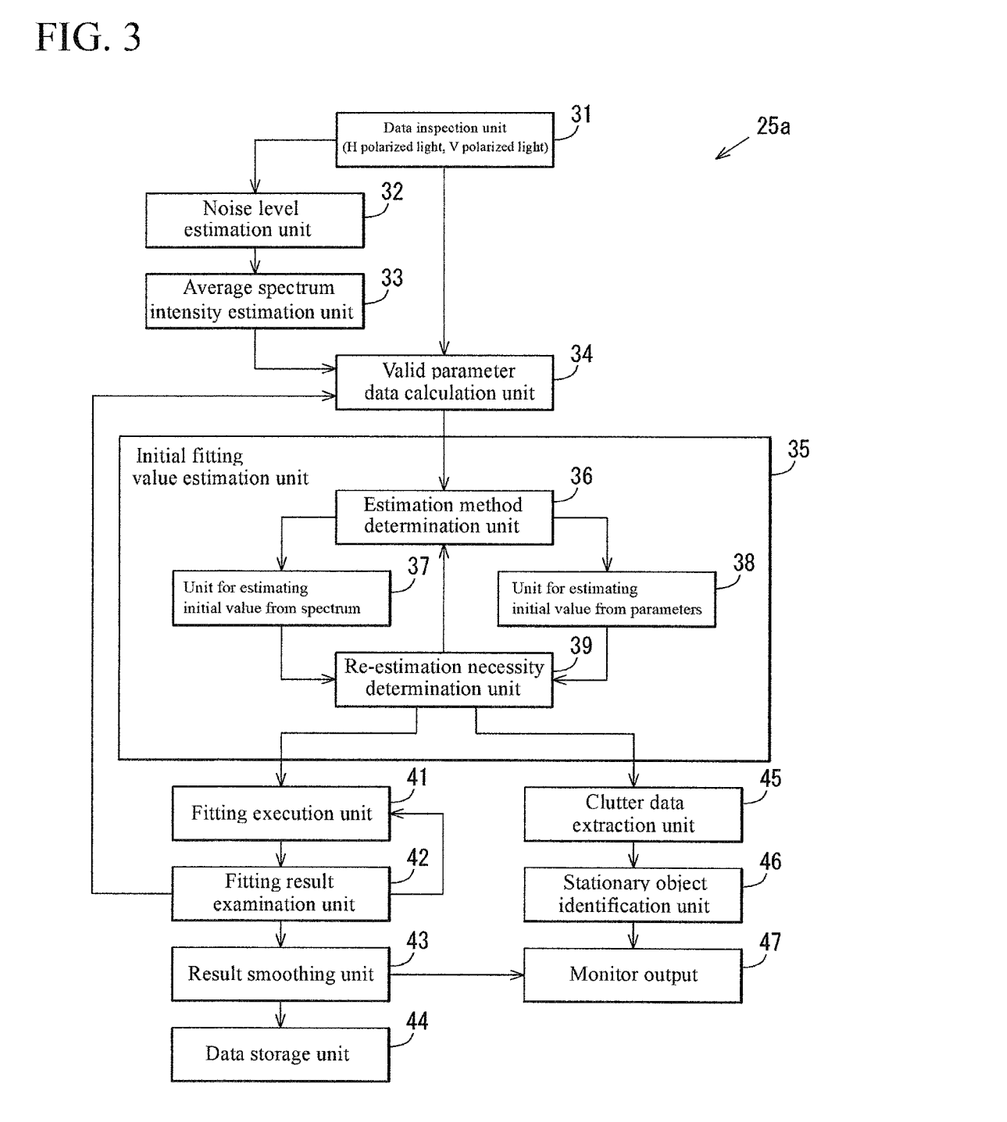
FIG. 3 is a functional block diagram illustrating functions executed by an analysis program.
Figure 4:
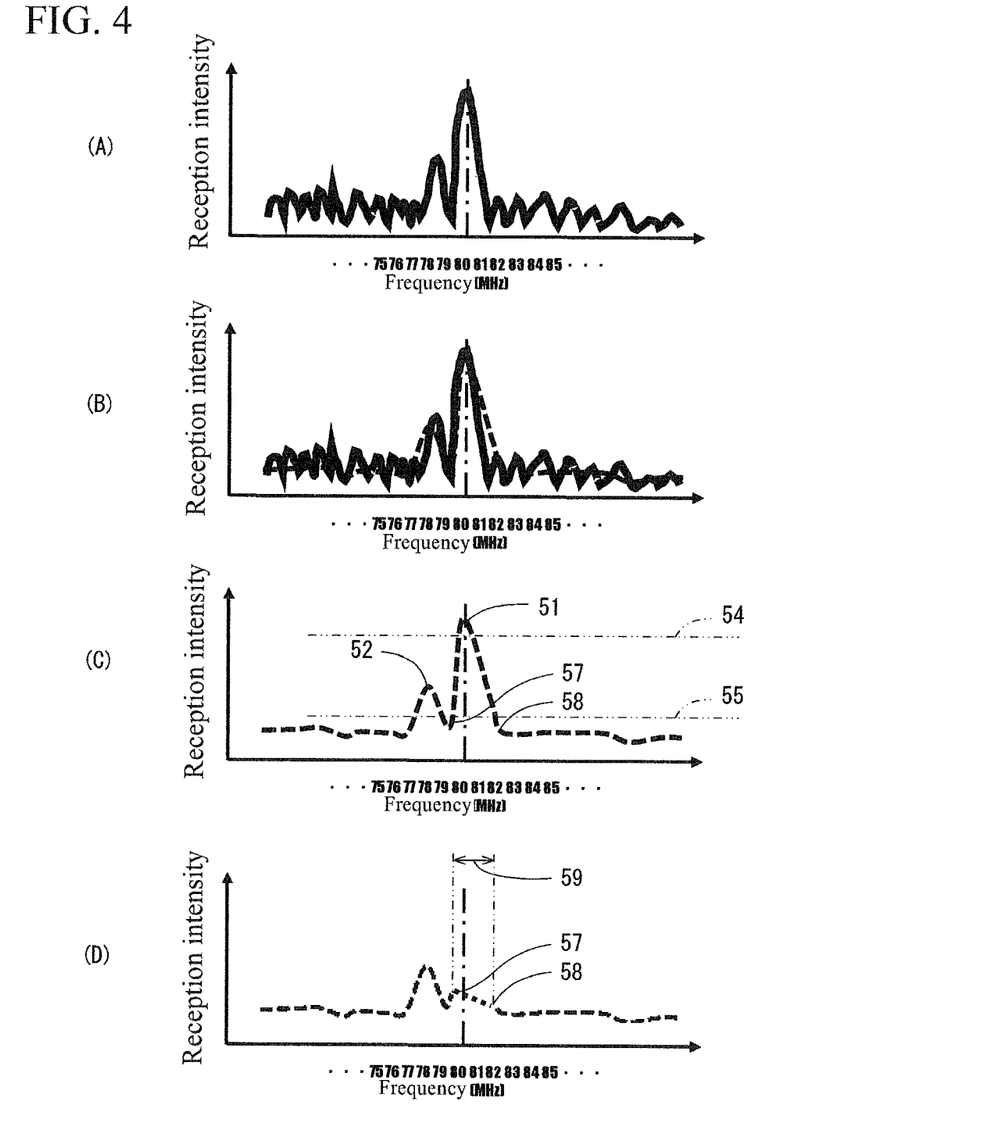
FIG. 4 is a flow chart of a process for excluding a peak resulting from an obstacle.

FIG. 3 is a functional block diagram illustrating functions which the control unit 21 of the analysis device 3 executes according to the analysis program 25a, and FIG. 4 is an explanatory diagram illustrating data processing under analysis. Further, the processing by the functional blocks shown in FIG. 3 is executed on a range basis defined by direction and distance, and is repeated for all ranges.

A data inspection unit 31 acquires spectrum data from the reflected light data for inspecting. That is, the data inspection unit 31 continues the process when the reflected light data are valid data to allow the data to be stored, and when missing of observation exists more than a predetermined amount in the reflected light data and when there are no data, the data are not stored in the spectrum FIFO bank 25b, the parameter FIFO bank 25c, and the number of valid data FIFO bank 25d.

In addition, the data inspection unit 31 proceeds the process to a valid parameter data calculation unit 34 when there is no problem in the spectrum data of the reflected light data, and otherwise, proceeds the process to a noise level estimation unit 32.

The noise level estimation unit 32 estimates a level of noise existing in the spectrum data of the reflected light data. This noise level estimation may be done by appropriate methods such as by estimating based on a predetermined value, or a region having peaks of predetermined numbers or more is estimated as the noise level.

An average spectrum intensity estimation unit 33 estimates average spectrum intensity from the acquired spectrum of the reflected light data. This estimation may be done by appropriate method such as by estimating in advance from past data, or estimating by acquiring an average value of spectrum intensities from the present data.

The valid parameter data calculation unit 34 calculates valid parameters from the spectrum data of the reflected light data. These parameters may be appropriate parameters such as altitude and peak power, altitude and Doppler shift, altitude and spectrum width, and altitude and SQUS etc. The valid parameter data calculation unit 34 which has thus calculated the parameters passes the process to an initial fitting value estimation unit 35 for estimating an initial fitting value.

The initial fitting value estimation unit 35 has an estimation method determination unit 36, an unit for estimating initial value from spectrum 37 (spectrum initial value estimation process), an unit for estimating initial value from parameters 38 (parameter initial value estimation process), and a re-estimation necessity determination unit 39 (fitting do-over determination unit).

The estimation method determination unit 36 determines as that, from which the initial value should be determined; from the spectrum or from the parameters. Specifically, if the number of peaks in the spectrum of the previous observation data (or average data of a plurality of observation data) stored in the spectrum FIFO bank 25b is at a predetermined number or less (for example, 1 or less), the initial value is determined to be estimated from the spectrum of the previous observation data, and otherwise, the initial value is determined from the parameters of the previous observation data.

The unit for estimating initial value from spectrum 37 estimates the initial value from the spectrum of average data of a plurality of past observation data. In this initial value estimation, the spectrum is assumed as the initial value without any change. The observation data averaged here may be predetermined numbers of data from the most recent one, and may be all observation data stored in the spectrum FIFO bank 25b.

The unit for estimating initial value from parameters 38 estimates the initial value from average values of parameters of a plurality of observation data stored in the parameter FIFO bank 25c. In the initial value estimation from the parameters, each of average values of parameters of predetermined number of times from the most recent one may be assumed as the initial value, and may be the average value of all data of the parameter FIFO bank 25c.

Thus, the estimation of the initial value from the most recent observation data by the unit for estimating initial value from spectrum 37 or the unit for estimating initial value from parameters 38 allows realizing an appropriate analysis utilizing a fact that the condition of atmosphere does not change so much as long as the position (spot) is the same.

The re-estimation necessity determination unit 39 determines whether the initial value estimated by the unit for estimating initial value from spectrum 37 or the unit for estimating initial value from parameters 38 is appropriate or not, and adopts the value without any change when appropriate, and does over the estimation when it is inappropriate. Specifically, when the initial value estimated from the parameters is not in a predetermined allowable extent or the number of peaks in the initial value estimated from the spectrum is not in predetermined allowable numbers, the process is returned to the estimation method determination unit 36, and the process is done over.

Thus, for example, in a case where, an initial value was estimated by the unit for estimating initial value from parameters 38 because the number of peaks of the spectrum was at the predetermined value or less, but when the estimated initial value is not in the predetermined appropriate extent or when observation was missing etc., it is possible to do-over the estimation to estimate the initial value by the unit for estimating initial value from spectrum 37. By thus setting an initial value as preferable as possible based on the past observation data, the accuracy in the later fitting can be improved.

A fitting execution unit 41 (fitting processing unit) executes fitting using the determined initial value. This fitting may be done by an existing appropriate fitting process, and this example uses a Gaussian fitting where a least-square method is used.

Specifically, as shown in FIG. 4 (A) in which vertical axis is reception intensity and horizontal axis is frequency, the spectrum of reflected light data in a certain direction at a certain time shows a rough spectrum with noise.

On the contrary, as shown in FIG. 4 (B), by performing a fitting process using the initial value for smoothing, a spectrum with less roughness can be obtained as shown in FIG. 4 (C). Here, because the initial value is input properly, the appropriate fitting is performed.

Particularly, transmission frequency of a laser light (80 MHz in this example) shows reflection from scattering bodies which are not moving, and the rest of frequencies show reflection from scattering bodies which are moving. The example of FIG. 4 (A) shows the spectrum of reflected light in a direction where an obstacle exists, and when smoothed, two peaks, 51 and 52 appear as shown in FIG. 4 (C). Here, the obstacle includes a structure such as a building, and/or a flying object such as a bird or an UAV (uninhabited airborne vehicle), and it indicates a solid body of a visible size.

In a case of the reflection originating from a structure obstacle, the peak 51 is represented as an extremely strong steep peak at a frequency identical with the transmission frequency as shown in the figure.

Also, in a case of the reflection originating from a flying object obstacle, the peak 51 appears as an extremely strong steep peak at an arbitrary frequency, and this peak moves according to movement of the flying object continuously in terms of time. That is, when the spectrum in a certain direction at a certain distance is represented as a spectrum of a certain range, a similar steep peak 51 appears in an adjacent range as time passes.

However, originally, the peak 51 by such obstacle is unnecessary, and what is necessary is information of the second highest peak 52. The peak 52 is shown for that a Doppler shift due to aerosol moving by wind is detected, and this needs to be acquired accurately. Here, by setting the initial value using the past observation data, not assuming the maximum peak as the initial value, this actually necessary area around the peak 52 can be fitted as the initial value of the fitting.

It is thereby possible to prevent the smoothing in which the peak 51 originating from an obstacle is assumed as the initial value for the fitting, making the necessary peak 52 buried. Further, the past observation data is processed as described in the following, and the spectrum and the parameters are stored with the peak 51 originating from an obstacle being removed. Thus, the appropriate initial value can be set from which an influence of the obstacle has been excluded.

A fitting result examination unit 42 examines whether the result of the fitting is appropriate or not, and proceeds to the next process if appropriate, but if it is inappropriate, returns the process to the valid parameter data calculation unit 34 or the fitting execution unit 41 depending on the content.

Particularly, as shown in FIG. 4 (C), when the value of the fitted peak 52 is larger than a predetermined maximum allowable value 54, the process is returned to the fitting execution unit 41 to do-over the fitting. Here, if the initial value was estimated by the unit for estimating initial value from spectrum 37, the fitting is done-over by assuming an average spectrum of the rest of the observation data, in which the oldest observation datum (spectrum) is reduced, as the initial value. In addition, if the initial value was estimated by the unit for estimating initial value from parameters 38, the fitting is done-over by assuming an average parameter of the rest of the observation data, in which the oldest observation datum (parameter) is reduced, as the initial value.

Thus, no matter which initial value estimation method is used, by reducing data, which is to be references in taking the average, to only the most recent observation data, appropriate fitting is allowed even if there was a big change. That is, since the atmospheric condition does not change so suddenly, the appropriate fitting can generally be realized by assuming the average value of all the past observation data as the initial value. However, when there is a big change such as generation of a wind gust, a preferable result cannot be obtained from the average of all the data. In such case, by reducing the observation data, which contributes evidence for the initial value estimation, from the old data to approximate to the average of latest data, and eventually adopting the most recent observation datum (spectrum or parameter), temporal resolution can be improved to allow estimating the initial value appropriately responding to the big change.

The maximum allowable value 54 is preferably assumed as a maximum value of the peak 52 originating from aerosol (that is, a peak excluding the peak 51 originating from an obstacle) in the past observation data, or a value close to such value, or alternatively a value a little lower than the peak value originating from an obstacle. When it is assumed as the one around the maximum value of the peak 52 originating from aerosol, it can be set for example within an extent ±20% of the maximum value, preferably set within an extent ±10% thereof, and appropriately set within an extent ±5% thereof. In addition, when it is assumed as the one a little lower than the peak value originating from an obstacle (preferably the past average value, and may be the maximum peak value or the minimum peak value), it can be set within an extent −20% from the peak value originating from an obstacle, preferably set within an extent −10% therefrom, and appropriately set within an extent −5% therefrom. In this example, it is set as the value −5% of the past average value of the peak value originating from an obstacle.

Further, the fitting result examination unit 42 is configured such that when the value of fitted peak 52 is larger than the predetermined maximum allowable value 54, the process is returned to the fitting execution unit 41, but not limited hereto, the process may be returned to the fitting execution unit 41 when the fitted peak 52 is away from a peak position of the last observation data by a predetermined amount or more. In such case, when the fitting is too far, the process to do-over the fitting can be realized, and a more appropriate fitting can be executed.

In addition, when the value of fitted peak 52 is smaller than the predetermined minimum allowable value 55, the fitting result examination unit 42 returns the process to the valid parameter data calculation unit 34 to do-over from the calculation of valid parameters. The minimum allowable value 55 here may be a noise level determined from the past observation data, or a value close to the noise level. The value close to the noise level may be within an extent +20% from the noise level (preferably, past average value, and may be the maximum value or the minimum value), preferably within an extent +10% therefrom, and appropriately within an extent +5% therefrom. In this example, it is set as the value +5% of the past average value of the noise level.

A result smoothing unit 43 (unit for determining peak originating from an obstacle, unit for excluding peak originating from an obstacle) removes the peak 51 originating from an obstacle shown in FIG. 4 (C) as shown in FIG. 4 (D). Particularly, the result smoothing unit 43 scans the spectrum from a peak center (in the illustrated example, it is the transmission frequency of 80 MHz, but in the case of the obstacle originating from a flying object, it becomes a frequency different from the transmission frequency) to a high frequency side and a low frequency side to look for a tilt steeper than a predetermined obstacle-originating determination tilt value. If there is a tilt steeper than the obstacle-originating determination tilt value, it is determined as the peak 51 originating from an obstacle, and further scanned to the high frequency side and to the low frequency side to extract switching points 57, 58 which become tilts more gradual than the obstacle-originating determination tilt value. Then as shown in FIG. 4 (D), a process of changing the spectrum to a shape connecting the switching point 57 on the low frequency side and the switching point 58 on the high frequency side linearly is performed to remove an upper part above a base part of the peak 51 originating from an obstacle. The peak of a peak extent originating from an obstacle 59 is thus removed, and the spectrum without the peak originating from an obstacle is acquired.

In addition, in determining as being the peak 51 originating from an obstacle, in addition to the above described steepness of the tilt, the determination as being the peak 51 originating from an obstacle may be made only when either of the followings is satisfied; (1) a peak exists within frequencies of a predetermined extent from the transmission frequency of a laser light, or (2) there is a similar steep peak in an adjacent range measured at an adjacent time. In this case, the peak 51 originating from an obstacle can be detected more accurately. Here, the adjacent time may be 10 minutes or less, preferably 5 minutes or less, more preferably 1 minute or less, further preferably 30 seconds or less, and appropriately 10 seconds or less. In addition, the adjacent range is away by preferably 10 ranges or less, more preferably 5 ranges or less, further preferably 3 ranges or less, and appropriately 1 range or less, in terms of direction, distance and height, respectively.

In addition, the result smoothing unit 43 also executes a singularity correcting process performing correction when results seen on a range basis are inappropriate. Particularly, since the condition of atmosphere changes similarly in close regions, it does not differ much between neighboring ranges (or at adjacent ranges in a predetermined extent), that is, at a neighboring direction and/or a neighboring distance and/or a neighboring height. Thus, in a certain range seen from the Doppler lidar 2, despite that one neighboring data (data neighboring on nearer distance, neighboring on one direction, or neighboring on one height) and the other neighboring data (data neighboring on farer distance, neighboring on the other direction, or neighboring on the other height) are of similar values, when data in a range therebetween is not similar, the data in this range is removed and changed instead to intermediate values between the data neighboring on near distance and the data neighboring on far distance by interpolation. The data compared and interpolated here may be appropriate data such as a peak value, or wind information such as wind velocity. By the observation data with interpolated values thus assigned, inappropriate data due to noise etc. can be reduced, and the analysis can be performed appropriately and accurately.

A data storage unit 44 adds the spectrum, in which the peak 51 originating from an obstacle is cut, to the spectrum FIFO bank 25b as the observation data, adds the parameters acquired by the valid parameter data calculation unit 34 to the parameter FIFO bank 25c, and adds validity/invalidity of each of the data to the number of valid data FIFO bank 25d, to store the latest data. Further, in addition to these FIFO banks, it is preferable to accumulate same data (spectra and parameters) in an appropriate data base. The past observation data can be accumulated thereby, and past information deleted from the spectrum FIFO bank 25b and/or the parameter FIFO bank 25c can also be referred to.

In addition, the above described re-estimation necessity determination unit 39 extracts clutter data by a clutter data extraction unit 45 as a process for display. The clutter data by a structure and/or a flying object can be extracted thereby.

A stationary object identification unit 46 identifies a stationary object (obstacle) from a clutter extracted by the above described clutter data extraction unit 45. That is, since the position where the clutter exists is the position where the structure or the flying object exists, the stationary object is identified and displayed to allow for easy understanding by users.

A monitor output unit 47 displays the observed spectrum data etc. on a display unit 24 (refer to FIG. 1) for monitoring with the position of the stationary object identified by the above described stationary object identification unit 46. Thus, the wind condition such as wind velocity and the position of an obstacle object such as a building can be superimposed for display, and allows users to understand easily.

By the above configuration and operation, the Doppler shift of aerosol can be detected with a high degree of accuracy.

Since the peak originating from an obstacle can be determined, it is possible to exclude the peak originating from an obstacle, and extract and detect the effect of aerosol only.

In addition, the spectrum of the observation data is stored with the peak originating from an obstacle being removed, and thus, the observation data in which the effect of the obstacle is excluded can be used. Also, by performing the fitting using such observation data, the peak originating from aerosol is appropriately fitted, not performing fitting to the peak of the obstacle, and thus, detection can be done with accuracy.

In addition, in a conventional peak-searching method, the peak originating from an obstacle may be adopted as the first peak, or the second peak may be adopted uniformly in an attempt to avoid the peak of the obstacle, resulting in missing an important peak at a portion where there is no obstacle, but the peak originating from aerosol can be appropriately detected without such problems.

Figure 5:
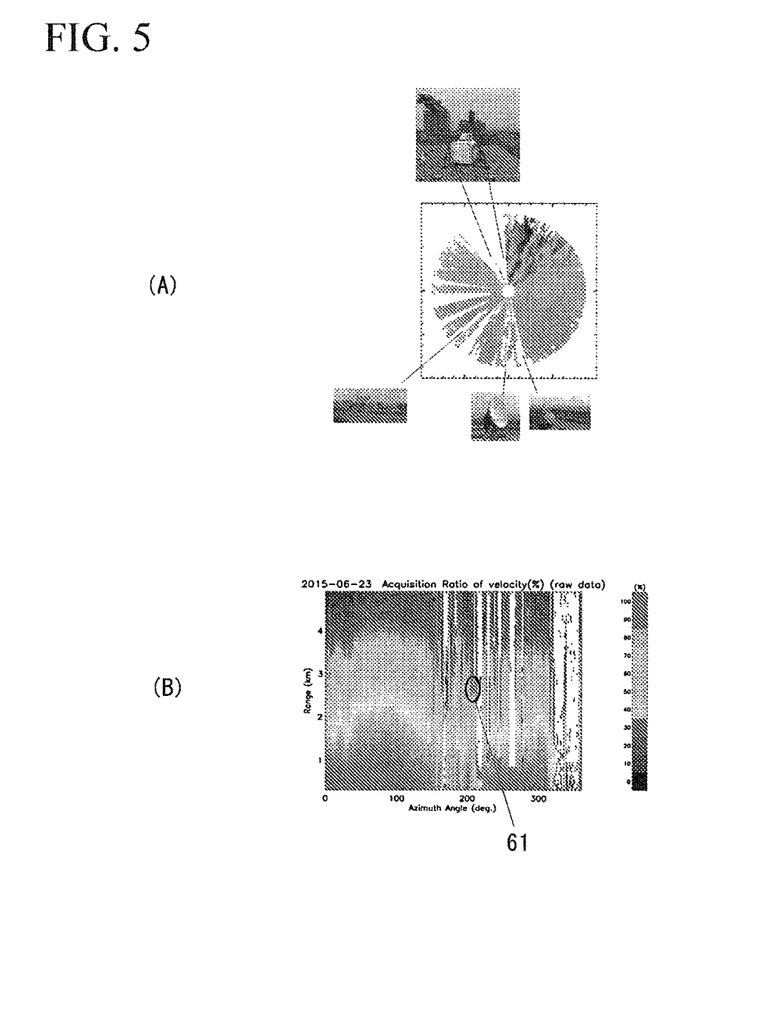
FIG. 5 shows explanatory diagrams each illustrating reflected light data.

Particularly, as shown in an explanatory diagram of reflected light data of FIG. 5 (A), in a figure representing reflected light data of 360°, in which a distance from a center and a wind condition (for example wind velocity) are shown by colors, observations are missed in each of directions where an obstacle exists due to the obstacle existing around the observation spots.

When this reflected light data is shown by a graph in which the vertical axis is distance (km), and the horizontal axis is angle of direction (degree), and color is data acquisition rate (%) as shown in FIG. 5 (B), the value at a portion before an obstacle-existing position 61 where the obstacle exists (near distance portion) is unnaturally dropped, and it is understood as inappropriate data.

On the contrary, by removing the peak originating from an obstacle according to the present invention, the effect of the obstacle can be excluded to appropriately detect the Doppler shift due to aerosol at a position before the obstacle. Therefore, the wind condition such as wind velocity and/or wind direction can be measured with accuracy.

Since the upper part above the base part of the peak 51 originating from an obstacle is removed to be changed to a spectrum without the peak originating from an obstacle, an appropriate observation is available by utilizing necessary data. That is, the effect of the obstacle is deleted, and the movement of aerosol at a position before the obstacle can be observed with accuracy.

In addition, since the peak originating from a structure is excluded after executing the fitting, the effect of noise can be reduced and excluded appropriately.

In addition, by thus utilizing the fact that a wind velocity spectrum property becomes a normal distribution, an echo due to aerosol can be analyzed by a fitting operation with the least-square method in a process of deriving wind velocity from the Doppler lidar 2.

In addition, an averaging process of a plurality of spectrum data from preliminary observation in the same direction, by the average spectrum intensity estimation unit 33 (refer to FIG. 3), allows peak-searching by the initial fitting value estimation unit 35 after the noise level is reduced to determine the initial value of the least-square method for performing the fitting, and a real time analysis can be realized with a high degree of accuracy.

In addition, among atmosphere turbulence and atmosphere molecular motion which control movement of aerosol in atmosphere, not only an effect of the former but also that of the latter are fitted simultaneously, and thus, only the former can be extracted with a high degree of accuracy to estimate the wind velocity precisely.

In addition, also in a case where a larger change in a fitting result is seen compared to the one acquired last in the same direction, the fitting process can be done by assuming the last fitting result as the initial value. With the initial value of the fitting being past data after the fitting, a result more appropriate than when the reflected light data is directly assumed as the initial value can be acquired.

In addition, this analysis approach allows a low SNR, and the data acquisition with a high degree of accuracy becomes available in a far region of 10 km or more where data has conventionally been omitted for quality control. In this example, the maximum observation distance of 30 km can be realized, and the available observation extent can be made ten times as much as the conventional products.

In addition, in near distance, an improvement of range resolution can be realized, and the minimum value of the range resolution which has conventionally been around 30 m can be improved to around 3-5 m.

In addition, even if there is an inappropriate portion in a part of the acquired reflected light data due to obstacles etc., by removing the peak originating from an obstacle, and performing interpolation using surrounding data to spots where range continuity is not maintained, data at least partially useful is left as much as possible with inappropriate data portions deleted, and thus, larger quantity of detailed observation data can be accumulated than in the past and the analysis with a high degree of accuracy is available.

Further, the present invention is not limited to the above described embodiment, and other various embodiments may be available.

For example, such analysis may be configured such that a real time processing is performed on FPGA and/or the cloud, and a data quality control by a median filter is performed to store observation results for graphical display. A similar operational effect can be provided in this case as well.

In addition, the Doppler lidar 2 and the analysis device 3 are configured separately, but the Doppler lidar 2 and the analysis device 3 may be configured as being placed in a housing as one device. The same operational effect can be provided in this case as well.

In addition, the spectrum and the parameters stored in the data storage unit 44 can be used to allow for being utilized as a wind condition observation device for observing wind conditions such as wind velocity and/or wind directions. It is thereby possible to observe the wind condition to be utilized for various usages such as for weather forecasting, for observation of wind condition of areas where aircrafts fly and security at the time of their taking-off and landing, for calculating appropriate spots as installation sites of wind power generators etc.

INDUSTRIAL APPLICABILITY

The present invention can be used for various industries which use wind conditions such as an industry which calculates appropriate installation sites of wind power generators, an industry which observes air streams for secure operation of aircrafts, an industry of weather forecasting etc.

REFERENCE SIGNS LIST

3: Analysis device
21: Control unit
22: Data acquisition unit
25a: Analysis program
37: Unit for estimating initial value from spectrum
38: Unit for estimating initial value from parameters
39: Re-estimation necessity determination unit
41: Fitting execution unit
43: Result smoothing unit

The invention claimed is:

1. A Doppler shift analysis device comprising:
a data acquisition unit for acquiring reflected light data for a laser light reflected by an atmospheric aerosol; and
an operation unit for analyzing a Doppler shift of the reflected light data,
wherein the operation unit comprises a peak-originating-from-obstacle exclusion unit for excluding the peak portion originating from an obstacle from the reflected light data, and
the peak-originating-from-obstacle exclusion unit has a peak-originating-from-obstacle determination unit for determining a peak having a slope as the peak portion originating from an obstacle, wherein the slope is defined as a slope of reception signal intensity to frequency at a predetermined steepness or more.

2. The Doppler shift analysis device according to claim 1, wherein the peak-originating-from-obstacle determination unit determines the peak having the slope as the peak portion originating from an obstacle when the peak exists at a frequency identical with a transmission frequency or when another peak having the slope exists in an adjacent range of a predetermined extent at an adjacent time.

3. The Doppler shift analysis device according to claim 1 further comprising a fitting processing unit for fitting a spectrum of the reflected light,
wherein the determination by the peak-originating-from-obstacle determination unit is performed after the fitting by the fitting processing unit.

4. The Doppler shift analysis device according to claim 1, wherein the peak-originating-from-obstacle exclusion unit performs the exclusion by changing the signal intensity between lower endpoints of two intervals on either side of the peak portion originating from an obstacle where the slope of reception signal intensity to frequency is at the predetermined steepness or more, to a predetermined value.

5. The Doppler shift analysis device according to claim 3, wherein the operation unit estimates an initial value for the fitting by the fitting processing unit by either of:
a spectrum initial value estimation process for estimating the initial value based on past spectra, or
a parameter initial value estimation process for estimating the initial value based on past parameters.

6. The Doppler shift analysis device according to claim 3, wherein the operation unit comprises a fitting do-over determination unit for determining whether the spectrum after the fitting by the fitting processing unit is appropriate or not, and doing-over fitting if not appropriate.

7. A Doppler shift analysis method comprising steps of:
acquiring reflected light data for a laser light reflected by an atmospheric aerosol;
analyzing a Doppler shift of the reflected light data;
determining a peak having a slope as the peak portion originating from an obstacle, wherein the slope is defined as a slope of reception signal intensity to frequency at a predetermined steepness or more; and
excluding the peak portion originating from an obstacle from the reflected light data.

8. A non-transitory computer readable storage medium tangibly embodying a computer readable program code having computer readable instructions that, when executed by a computer, causes the computer to carry out a Doppler shift analysis method, the method comprising steps of:
acquiring reflected light data for a laser light reflected by an atmospheric aerosol;
analyzing a Doppler shift of the reflected light data;
determining a peak having a slope as the peak portion originating from an obstacle, wherein the slope is defined as a slope of reception signal intensity to frequency at a predetermined steepness or more; and
excluding the peak portion originating from an obstacle from the reflected light data.

9. The Doppler shift analysis method according to claim 7, wherein the determining step determines the peak having the slope as the peak portion originating from an obstacle when the peak exists at a frequency identical with a transmission frequency or when another peak having the slope exists in an adjacent range of a predetermined extent at an adjacent time.

10. The Doppler shift analysis method according to claim 7 further comprising a step of fitting a spectrum of the reflected light, wherein the determination step is performed after the fitting step.

11. The Doppler shift analysis method according to claim 7, wherein the excluding step includes a step of changing the signal intensity between lower endpoints of two intervals on either side of the peak portion originating from an obstacle where the slope of reception signal intensity to frequency is at the predetermined steepness or more, to a predetermined value.

12. The Doppler shift analysis method according to claim 10, wherein the analyzing step includes a step of estimating an initial value used in the fitting step, by either of:
estimating the initial value based on past spectra; or
estimating the initial value based on past parameters.

13. The Doppler shift analysis method according to claim 10, wherein the analyzing step includes a step of determining whether the spectrum after the fitting process is performed is appropriate or not, and doing-over fitting if not appropriate.

14. The non-transitory computer readable storage medium of claim 8, wherein the determining step determines the peak having the slope as the peak portion originating from an obstacle when the peak exists at a frequency identical with a transmission frequency or when another peak having the slope exists in an adjacent range of a predetermined extent at an adjacent time.

15. The non-transitory computer readable storage medium of claim 8, wherein the method further comprises a step of fitting a spectrum of the reflected light, wherein the determination step is performed after the fitting step.

16. The non-transitory computer readable storage medium of claim 8, wherein the excluding step includes a step of changing the signal intensity between lower endpoints of two intervals on either side of the peak portion originating from an obstacle where the slope of reception signal intensity to frequency is at the predetermined steepness or more, to a predetermined value.

17. The non-transitory computer readable storage medium of claim 15, wherein the analyzing step includes a step of estimating an initial value used in the fitting step, by either of:
estimating the initial value based on past spectra; or
estimating the initial value based on past parameters.

18. The non-transitory computer readable storage medium of claim 15, wherein the analyzing step includes a step of determining whether the spectrum after the fitting process is performed is appropriate or not, and doing-over the fitting process if not appropriate.

* * * * *